United States Patent
Robinson et al.

(10) Patent No.: US 10,345,869 B2
(45) Date of Patent: Jul. 9, 2019

(54) WEARABLE DEVICE HAVING AT LEAST ONE INTERCHANGEABLE TOUCH USER INTERFACE

(71) Applicant: Verizon Patent and Licensing Inc., Arlington, VA (US)

(72) Inventors: Quentin N. Robinson, Basking Ridge, NJ (US); Ai Mitsufuji, Palo Alto, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 70 days.

(21) Appl. No.: 14/788,279

(22) Filed: Jun. 30, 2015

(65) Prior Publication Data
US 2017/0003720 A1  Jan. 5, 2017

(51) Int. Cl.
| | |
|---|---|
| *G06F 1/16* | (2006.01) |
| *G06F 3/041* | (2006.01) |
| *G06F 3/0488* | (2013.01) |
| *G06F 3/01* | (2006.01) |
| *G04G 17/04* | (2006.01) |

(52) U.S. Cl.
CPC ......... *G06F 1/1692* (2013.01); *G04G 17/045* (2013.01); *G06F 1/163* (2013.01); *G06F 1/1628* (2013.01); *G06F 1/1632* (2013.01); *G06F 1/1643* (2013.01); *G06F 1/1684* (2013.01); *G06F 1/1698* (2013.01); *G06F 3/016* (2013.01); *G06F 3/0416* (2013.01); *G06F 3/0488* (2013.01); *G06F 3/04883* (2013.01)

(58) Field of Classification Search
CPC ...... G06F 3/041; G06F 3/0412; G06F 3/0414; G06F 3/0416; G06F 3/044; G06F 3/045; G06F 3/047; G06F 3/0488; G06F 1/1628; G06F 1/163; G06F 1/1643
USPC .................................................. 345/173–179
See application file for complete search history.

(56) References Cited

U.S. PATENT DOCUMENTS

| | | | | |
|---|---|---|---|---|
| 5,940,349 A | * | 8/1999 | Stewart | G04C 3/001 368/281 |
| 2004/0245334 A1 | * | 12/2004 | Sikorski | G06F 1/1626 235/383 |
| 2007/0075127 A1 | * | 4/2007 | Rosenberg | G06F 1/3203 235/375 |
| 2007/0289859 A1 | * | 12/2007 | Sandbach | D02G 3/441 200/506 |

(Continued)

*Primary Examiner* — Alexander Eisen
*Assistant Examiner* — Nelson Lam (57) ABSTRACT

A wearable device includes a core unit which is interchangeably attached to a container. The container may be configured to couple to a user, where the container may include a touch interface having a touch sensor associated with at least one surface of the container, a first inter-module communications interface (ICI), and a controller coupled to the touch interface and the ICI. The core unit may include a display, a second ICI which is communicatively coupled to the first ICI, a memory to store instructions and a processor. The processor may be configured to execute the instructions stored in memory to receive information through the first ICI and second ICI generated by the touch interface, where the information may be associated with a user command, and perform an operation in accordance with the received information associated with the user command.

20 Claims, 8 Drawing Sheets

(56) References Cited

U.S. PATENT DOCUMENTS

| | | | |
|---|---|---|---|
| 2009/0179854 A1* | 7/2009 | Weber | G06F 1/1626 345/156 |
| 2010/0321899 A1* | 12/2010 | Vossoughi | B60R 11/02 361/728 |
| 2011/0230265 A1* | 9/2011 | Amit | A61B 5/1123 463/35 |
| 2012/0063126 A1* | 3/2012 | Nickel | A44C 3/004 362/183 |
| 2012/0092822 A1* | 4/2012 | Mooring | G04G 17/04 361/679.21 |
| 2013/0106809 A1* | 5/2013 | Ohsaki | G06F 1/1694 345/204 |
| 2014/0111548 A1* | 4/2014 | Shin | G09G 5/32 345/650 |
| 2014/0139486 A1* | 5/2014 | Mistry | G06F 3/0304 345/175 |
| 2014/0313230 A1* | 10/2014 | Suggs | G06T 3/00 345/648 |
| 2015/0009784 A1* | 1/2015 | Cho | G04G 21/08 368/224 |
| 2015/0077437 A1* | 3/2015 | Yin | G06F 3/03 345/671 |
| 2015/0153854 A1* | 6/2015 | Stewart | G06F 1/163 345/173 |
| 2015/0261189 A1* | 9/2015 | Connolly | G04G 21/04 368/277 |
| 2015/0335947 A1* | 11/2015 | Kaushansky | A63B 24/0062 340/870.07 |
| 2015/0338880 A1* | 11/2015 | Sato | G06F 1/163 361/679.03 |
| 2015/0346768 A1* | 12/2015 | Popalis | G06F 1/163 361/679.03 |
| 2016/0091867 A1* | 3/2016 | Mansour | G04G 21/08 368/294 |
| 2016/0162169 A1* | 6/2016 | Xu | G06F 1/1626 715/808 |
| 2017/0273415 A1* | 9/2017 | Watts | H04W 4/02 |
| 2019/0014242 A1* | 1/2019 | Piekarski | H04N 5/2252 |

* cited by examiner

SECTION A-A

WEARABLE DEVICE HAVING AT LEAST ONE INTERCHANGEABLE TOUCH USER INTERFACE

BACKGROUND

Wearable devices have seen increased popularity as computer technologies become more power efficient and continue to shrink in size, and as developers experiment with new form factors and human interfaces. However, reductions in device size and smaller form factors may present challenges to conventional user interface designs. The space constraints of small displays on wearable devices may render traditional touch interface gestures impractical, as a single finger can obscure a significant area of a small display.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Embodiments described herein are directed to wearable devices having touch interface(s) which may reduce obstructions of the display when interacting with the wearable device. The wearable device may be modular in that a touch user interface, which may be incorporated into a container, may be detachable from a core unit allowing user interchangeability of the touch interface. Alternatively, an alternative core unit for a given container may be used if the user so desires. Accordingly, by allowing user interchangeability between the core unit and the container incorporating the touch user interface, the user benefits from the flexibility of using a wide range of touch-user interfaces with a single core unit. As will be explained in more detail below, containers may include wrist straps (such as, for example, a watch band), arm bands, wrist bands, bangles, bracelets, lanyards, or necklaces. Additionally or alternatively, some containers may interface with articles of clothing and accessories, such as, for example, shirts, pants, dresses, gloves, belts, collars, hats, etc.

As used herein, the phrase "interchangeably coupled" or "interchangeably attached" may be defined herein as a physical and/or electrical coupling, joining, attachment, etc., permitting the user to remove an given touch user interface and switch to a different touch user interface with the core unit, or vice versa. In some embodiments, switching the touch user interface and/or core unit may be conveniently performed by the user without having to resort to the use of tools. In other instances, the use of tool, such a as a screwdriver, may be involved.

Figures 1A, 1B:
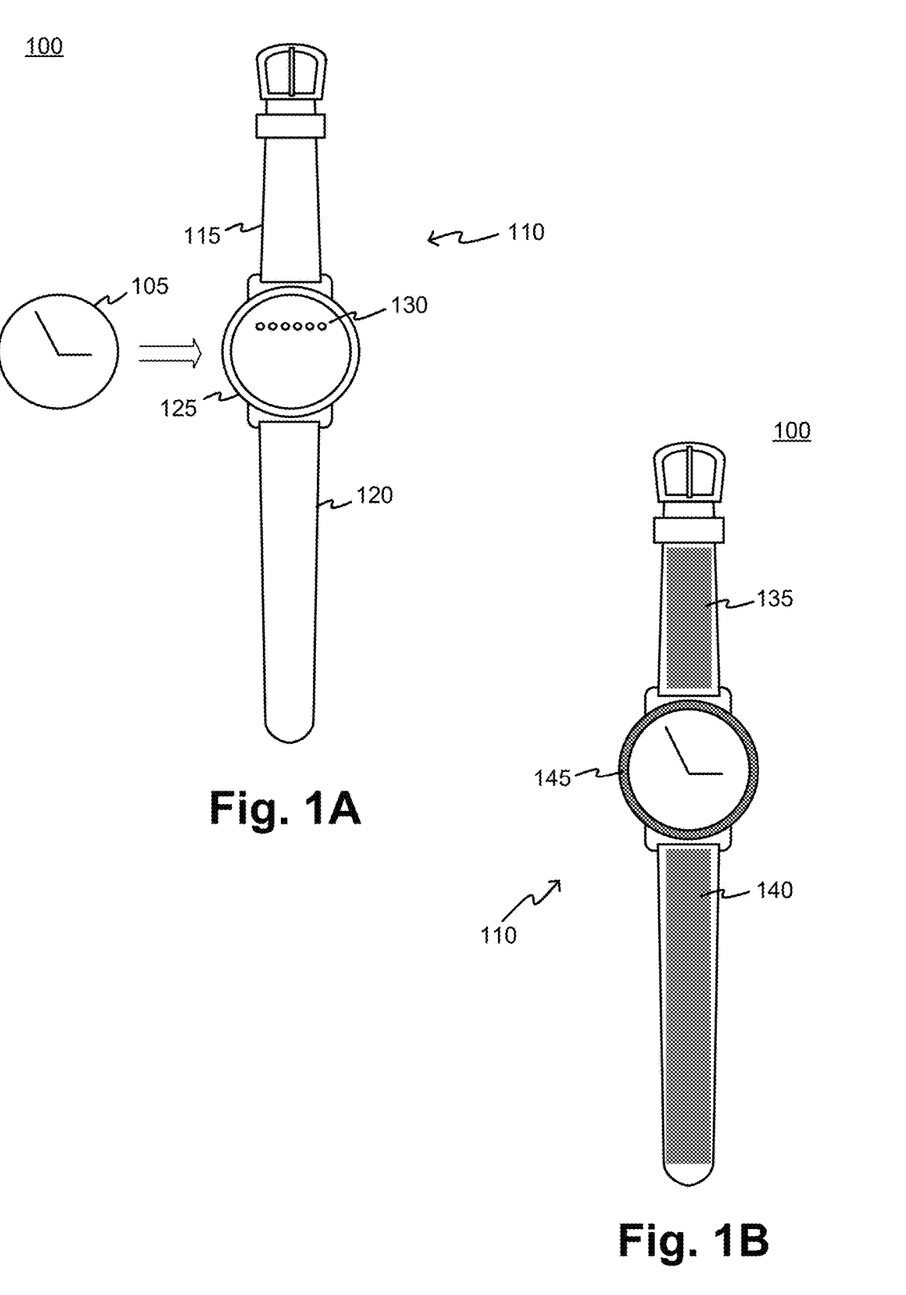
FIGS. 1A and 1B illustrate an exemplary wearable device embodied as a watch.

FIGS. 1A and 1B illustrate an exemplary wearable device 100 embodied in the form of a watch. Wearable device 100 may include a core unit 105 and a container 110. The container 110 may include a watch strap having first strap 115 and second strap 120, and a case 125. Case 125 may further include an inter-module communications interface ("ICI") 130. As shown in FIG. 1B, container 110 may include a plurality of touch user interfaces which may include a first touch user interface 135 incorporated into first strap 115, a second touch user interface 140 incorporated into second strap 120, and/or a bezel touch user-interface 145 incorporated into the bezel on case 125, shown via shading in FIG. 1B. While not shown, other areas of case 125 may incorporate touch user-interfaces, such as, for example, the sides and/or back of case 125 (wherein a touch user-interface on the back of case 125 may be useful in providing a larger surface area when needed, for example, when establishing settings for the watch).

As shown in FIGS. 1A and 1B, core unit 105 may be secured to case 125 by the user, and may establish one or more electrical connections with container 110 via inter-module communications interface ("ICI") 130. Touch inputs entered by the user at zones within touch interfaces 135, 140 and/or 145 may be converted to signals by touch sensors associated with the respective touch interfaces 135, 140, and/or 145, be converted to commands by container 110, and sent to core unit 105, via ICI 130, for appropriate action by a processor within core unit 105. Core unit 105 may provide feedback to the user indicating the touch input was received by displaying a visual indication on a graphical user interface shown on the display of core unit 105, and/or by generating a sound signal such as a soft click or short tone. The sound signal may be played through one or more speakers, for example, built into core unit 105, or that may be part of other components of container 110. Alternatively, core unit 105 may provide a physical (e.g., haptic, vibration, etc.) feedback, or provide a signal via ICI 130 to transducers in container 110, which may provide haptic feedback to the user (e.g., through transducers in case 125 and/or though transducers in first strap 115 and/or second strap 120.

Figure 2:
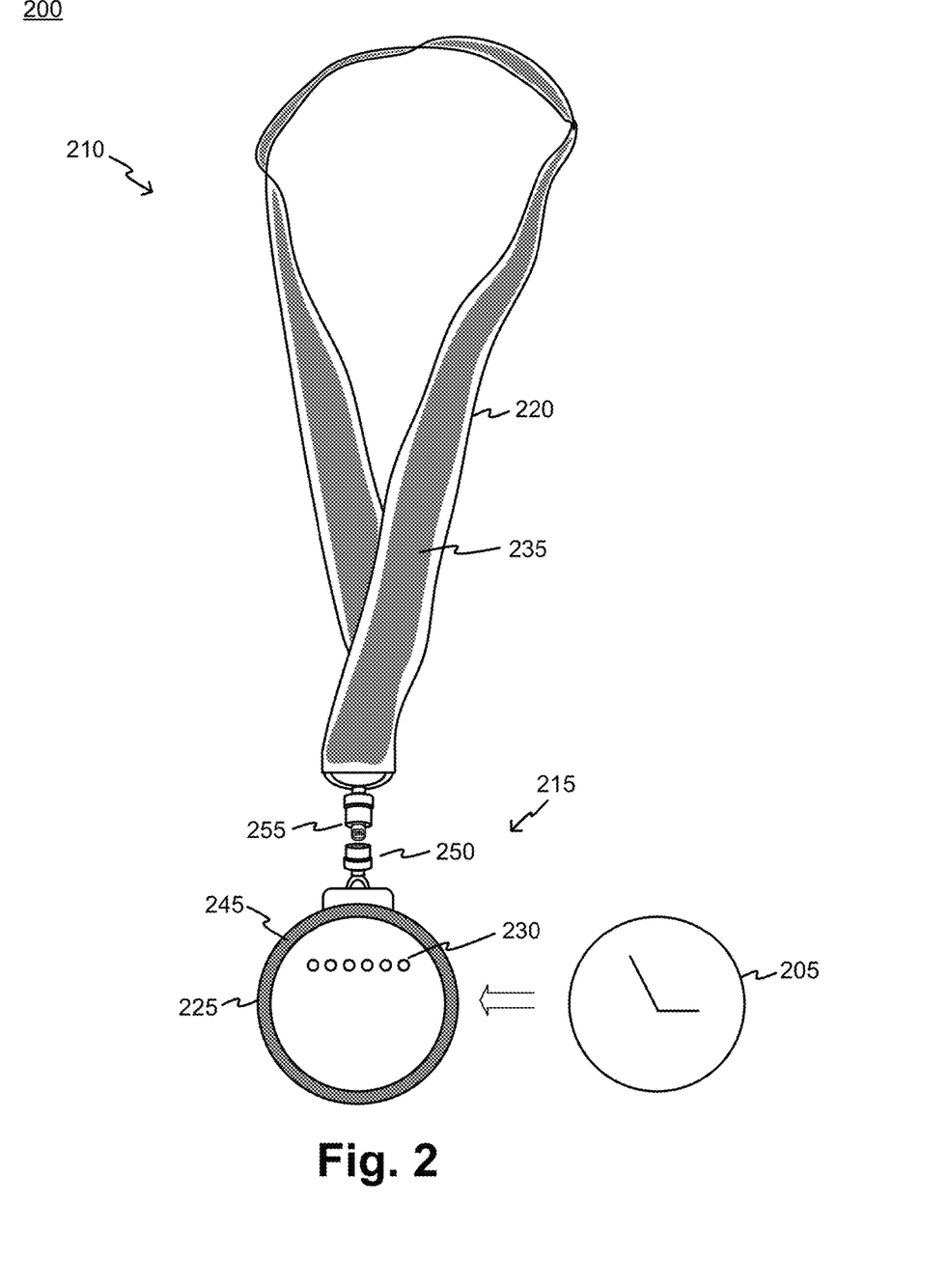
FIG. 2 illustrates an exemplary wearable device embodied as a pendant supported by a lanyard.

FIG. 2 illustrates an exemplary wearable device 200 embodied as a pendant 215 supported by a lanyard 220. For wearable device 200, a container 210 may include lanyard 220, connector 255, and pendant case 225. Pendant case 225 may further include connector 250 and ICI 230. Core unit 205 may be interchangeably attached to pendant case 225 to complete pendant 215. In other embodiments, any loop supported by the neck of the user may be used to suspend or otherwise attach to pendant 215, which may include, for example, a necklace, necktie, a collar, etc.

As shown in FIG. 2, container 210 may include a plurality of touch user-interfaces which may include a touch user-interface 235 (or portions thereof—e.g., touch sensors) incorporated into lanyard 220, and/or a bezel touch user-interface 245 incorporated into a bezel on pendant case 225. While not shown, other areas of pendant case 225 may incorporate touch user interfaces, such as, for example, the sides and/or back of pendant case 225. Core unit 205 may be secured in pendant case 225 by the user, where it may establish one or more electrical connections with container 210 through inter-module communications interface ("ICI") 230. Touch inputs entered by the user at zones within touch user interfaces 235 and/or 245 may be converted to signals by touch sensors associated with the respective touch user interfaces 235 and/or 245, be converted to commands by container 210, and sent to core unit 205, via ICI 230, for appropriate action by a processor within core unit 205. Touch user-interface 235 in lanyard 220 may support standard touch and multi-touch gestures, such as, tapping, pinching, sliding, etc. Touch sensors in touch interface 235 may be capacitive based. Additionally or alternatively, touch user interface 235 may include sensors that may provide a response to tugging, pulling, and/or stretching lanyard 220. Such sensors may include piezoelectric sensors which may provide signals in reaction to mechanical stresses (e.g., pulling forces) on lanyard 220.

Core unit 205 may provide feedback to the user indicating the touch input was received by displaying a visual indication on a graphical user interface shown on the display of core unit 205, and/or by generating a sound such as a soft click or short tone. Alternatively, core unit 205 may provide a physical (e.g., haptic, vibration, etc.) feedback, or provide a signal via ICI 230 to transducers in container 110, which may provide haptic feedback to the user (e.g., through transducers in pendant case 225 and/or though transducers in lanyard 220).

Further referring to FIG. 2, connector 255 may permit lanyard 220 to be interchangeably coupled to pendant 215 by forming a mechanical and/or electrical connection with connector 250 on pendant 215. This allows the user the flexibility to change lanyard 220 for another loop structure (e.g., a necklace, a collar, etc.) to suspend or otherwise support pendant 215. Connectors 255 and 250 may include a concealed electrical interface which may permit touch user interface 235 to pass signals to pendant 215. For example, touch signals may initially be sent to pendant case 225 and, in some embodiments, onto core unit 205 through ICI 230. In other embodiments, signals provided to pendent case 225 from touch user interface 235 may be detected and converted to commands, and then passed on to core unit 205 through ICI 230.

Connector 255 may be attached to lanyard 220 in a manner that may accommodate the twisting of lanyard 220 without stressing the electrical connection. Connector 255 may snap or screw onto connector 250 in a sufficiently secure manner so as to support the weight of pendant 215. An electrical interface in connector 225 may be used to provide feedback signals from core unit 205, via ICI 230, to transducers in lanyard 220 to provide haptic feedback. The electrical interface used by connectors 255 and 250 may be a universal serial bus (USB) interface (e.g., any variant of USB, include micro USB, USB 3, etc.), a lightning interface, or any suitable interface which may support the power and/or data requirements of lanyard 220, pendant case 225, and/or core unit 205.

Figure 3A:
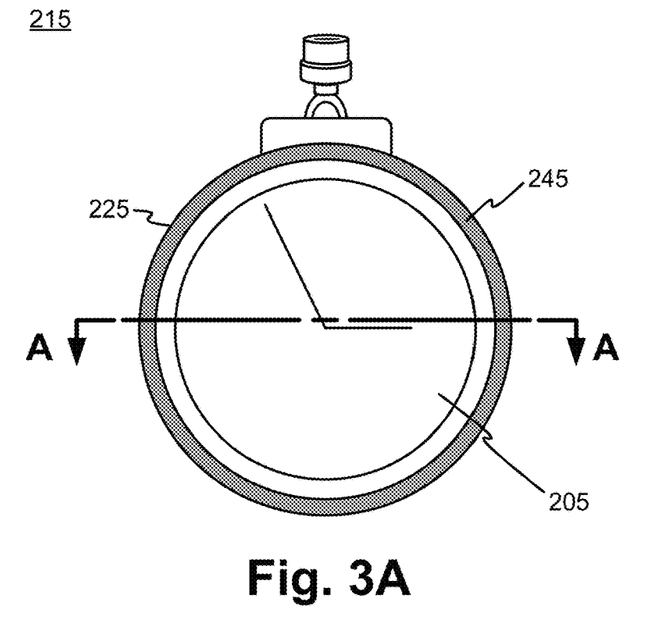
FIGS. 3A and 3B show various views of an exemplary wearable device and components associated with an embodiment.
Figure 3B:
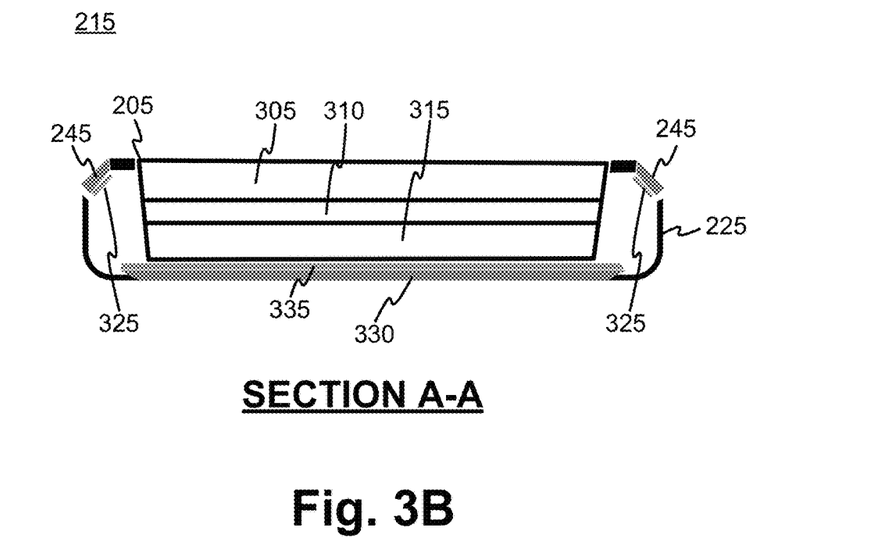

FIGS. 3A and 3B show different views of pendant 215 and exemplary components within pendant case 225 and core unit 205. FIG. 3A shows pendant 215 disconnected from lanyard 220 (or any other type of loop), and shows core unit 205 installed within pendant case 225. In the embodiment shown in FIG. 3A, pendant 215 may include bezel touch user interface 245 formed on pendant case 225. FIG. 3A indicates "SECTION A-A" taking slice through pendent 215 as shown, with the sectional view illustrating exemplary components of pendant 215 as shown in FIG. 3B. In the sectional view, labeled SECTION A-A, core unit 205 may be realized using a layered construction which may include a display 305, a printed circuit board 310, and battery 315. Core unit may electrically connect with pendant case 225 through ICI 230 (not shown in FIG. 3B) to transfer data regarding touch input and/or user feedback. Additionally, ICI 230 may include connectors for power, so that battery 315 in core 225 may also power electronics within container 210, which include devices in pendant case 225 and lanyard (e.g., touch sensors for touch user interface 230). In alternative embodiments, pendant case 225 may also include a battery. SECTION A-A shows cross sections of zones corresponding to bezel touch user interface 245, and cross sections of bezel touch sensors 325 placed in proximity of the zones of bezel touch user interface 245. Additionally, a cross section of a zone corresponding to a touch user interface 330 situated on the back of pendant case 225 is shown, along with corresponding touch sensor 335 to sense touch inputs provided on the back of pendant case 225. Additional sensors 325 and 335 may be used, and the placement of the sensors may vary in other implementations.

Figure 4A:
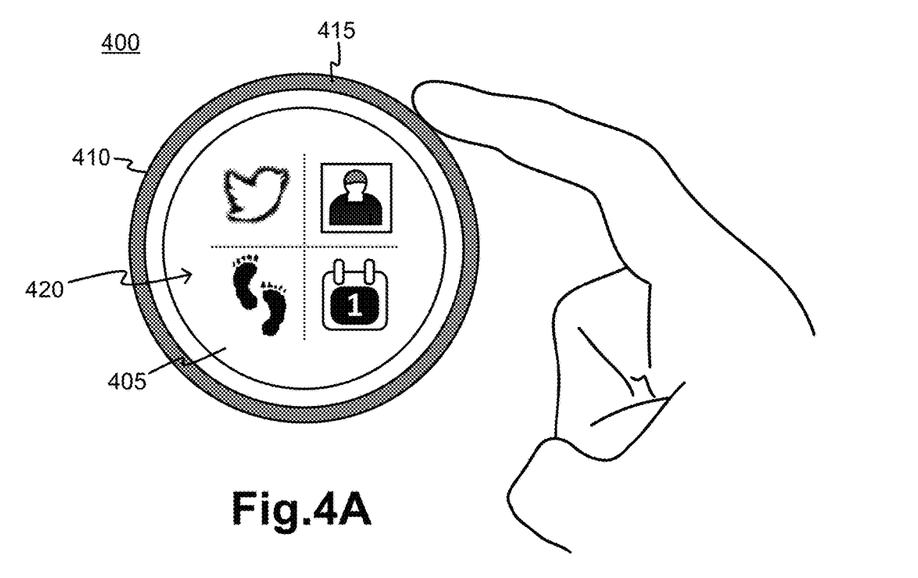
FIGS. 4A and 4B illustrates an exemplary user interface associated with an embodiment of a wearable device.
Figure 4B:
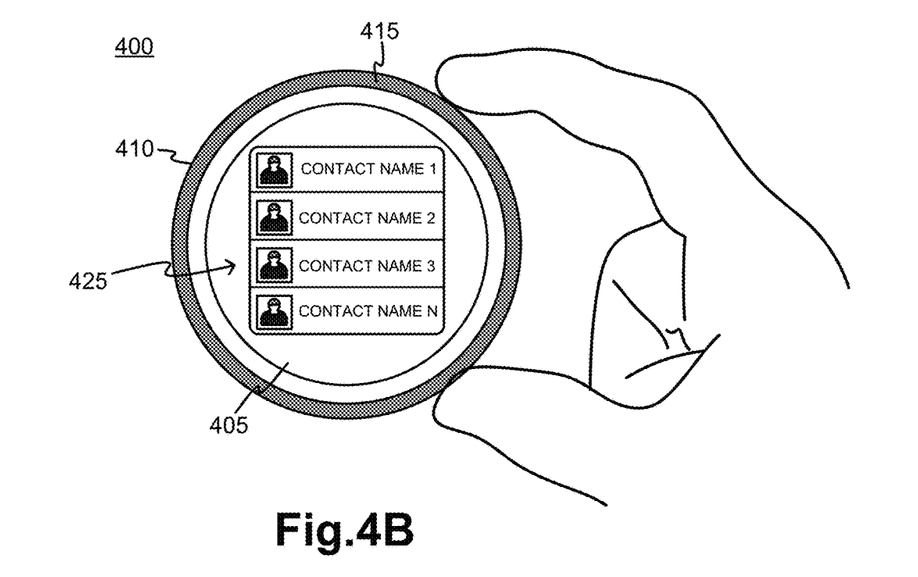

FIGS. 4A and 4B illustrates an exemplary graphical user interface associated with an embodiment of a wearable device 400. Shown in FIG. 4A is core unit 405 which shown as being secured within case 410. The display of core unit 405 may provide a graphical user interface 420 offering a number of selections to the user. Each of the selections of graphical user interface 420 may be placed in a separate section of the display of core unit 405, where a user may make a selection by touching (e.g., single or multiple tap, long tap, swipe, etc.) the section of bezel touch user interface 415 which corresponds to the item the user wishes to select. For example, when the display of core unit 405 is circular as shown in FIG. 4A, each item may correspond to a sector of the circular display, and the section of bezel touch interface 415 associated with selecting the item is an extension of the sector corresponding to an item.

For example, as shown in FIG. 4A, graphical user interface 420 may be divided into four sectors (e.g., quadrants) wherein each quadrant presents an icon corresponding to a particular function. For example, staring clockwise from the upper right quadrant, an icon corresponding to a contact list application is presented on graphical user interface 420. Next, in the lower right quadrant, an icon corresponding to a calendar application is provided. In the lower left quadrant, an icon corresponding to a pedometer application is shown, and in the upper left, an icon corresponding to a social media application is presented. In an aspect, the quadrants may correspond to and rotate with, or rotate as if they are, one or more of the hands of a watch. For example, the leading edge of a given quadrant, or other fractional 'slice' of the 'pie', may indicate the hour integer (e.g., 12) (or the time past an integer representing an hour (e.g., if the time were 12:30, the leading edge of a quadrant might be aligned with 15 degrees past a straight up position in a clock-wise direction)), the minute, or second of the time-of-day. As the quadrants rotate, the activation areas on the bezel corresponding to the quadrants may rotate in a similar manner, so the touch input zones are aligned with the rotated quadrants.

If a user wishes to activate the contact list application, the user may tap on the bezel touch user interface 415 in an area corresponding to the upper right quadrant as shown by the illustration of the hand in FIG. 4A, as opposed to touching the contact list application icon on graphical user interface 420. Case 410 will send the touch information to core unit 405 via the ICI (not shown), where the core unit 405 may activate the contact list application and display a list of contacts on graphical user interface 425 as shown in FIG. 4B. If the number of contacts extends beyond the screen shown on the display of core unit 405, the user may, for example, scroll through the contact list. For example, as shown in FIG. 4B, a scrolling motion may be initiated based on a multi-touch gesture, using, for example, a thumb and forefinger, to simulate a dialing or turning motion on bezel touch user interface 415 in the direction the user wishes to scroll the list. Thus, bezel touch user interface 415 may provide a simulated dial or wheel interface. In another embodiment, the user may simply use a single touch interface in the form of a sliding motion along a direction of bezel touch user interface 415 based on the direction the user wishes to scroll the contact list in graphical user interface 425. In each case, the user may interact with the case 410 (e.g., touch user interface 415) to provide input.

Figure 5:
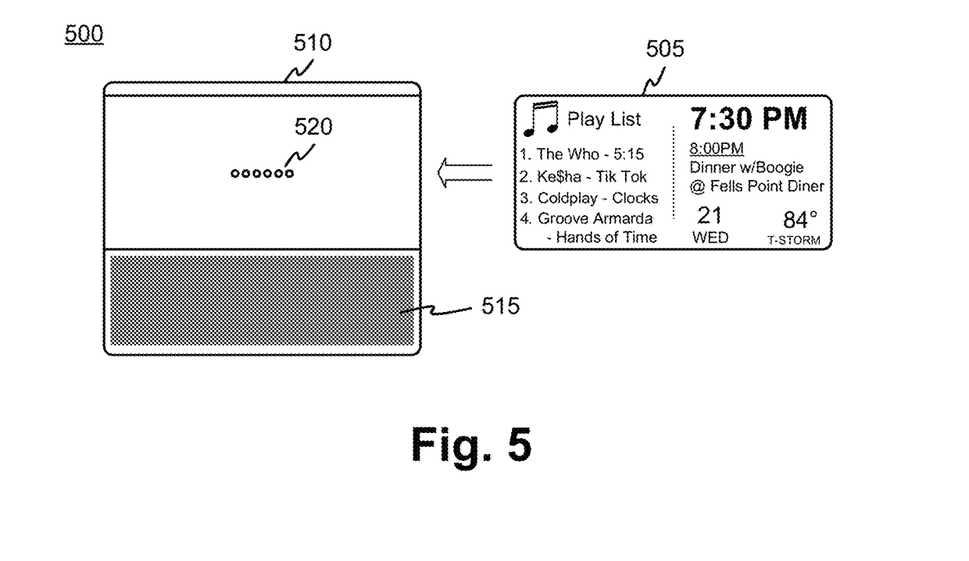
FIG. 5 shows an exemplary wearable device having a planar touch surface which may be coupled to other objects.

FIG. 5 shows an exemplary wearable device 500 having a planar touch surface which may be coupled to an item worn by the user, such as an article clothing and/or an accessory. Wearable device 500 may include core unit 505, case 510, touch user interface 515, and ICI 520. Core unit 505 may be interchangeably attached to case 510, so the core unit 505 may be easily swapped for use with other wearable devices. Core unit 505 may exchange data and/or power with case 510 through ICI 520.

Core unit 505 may include a display and show information based on the user's preferences. For example, as shown in FIG. 5, the display on core unit 505 may show a playlist generated by a music application on the left side, and time, weather, date, and calendar information on the right side of the display. The touch user interface 515 may be positioned substantially within a same plane as the display of the core unit 515. Within the same plane of the display, the touch user interface 515 may be positioned in a manner so that touch input may be entered by the user without obscuring the display of core unit 505. For example, as shown in FIG. 5, touch user interface 515 may be positioned below core unit 505 while lying substantially within the same plane of the display of core unit 505.

In some embodiments, wearable device 500 may be attached to a conventional (or "legacy") article of clothing and/or an accessory which was not designed specifically to attach and/or interface to wearable device 500. For example, wearable device 500 may attach to conventional gloves, shirts, pants, belts, hats, etc., wherein the user may enter touch inputs on touch user interface 515. Case 510 may be fixed to conventional clothing and/or accessories using fasteners such as, for example, magnetic fasteners and/or mechanical fasteners, and thus may be removed by the user. Mechanical fasteners may include, for example, snaps, zippers, buttons, clips, and/or Velcro strips. Haptic feedback to the user, for example, in response to detecting touch user input, may be provided through core unit 505 and/or case 510. The transducer or other device providing the haptic feedback would require sufficient energy to be detected by the user through the article of clothing and/or the accessory to which the wearable device 500 is attached.

Other embodiments of wearable device 500 may include articles of clothing and/or accessories which were specifically designed to interface to case 510. In such embodiments, the articles of clothing and/or the accessories may include electrical interfaces (either wired or wireless) to the case 510 for connection with touch interfaces and/or feedback transducers which may be built into the articles of clothing and/or accessories. In such embodiments, the container may not only include case 510, but may also include the connected clothing and/or accessory. The transducers in the clothing may not only be used to accept traditional touch input commands, but may also be used as measurement sensors to track body motion. For example, a body suit (or form fitting shirts and/or pants) may be used to track the motion and/or energy expenditure associated with arms, legs, etc., of the user during activity. Other sensors may be utilized to measure heartrate, respiration, temperature, galvanic skin response (a function of perspiration), blood sugar levels, etc. Core unit 505 may receive data for utilization with a fitness applications, health monitoring applications, etc.

Figure 6:
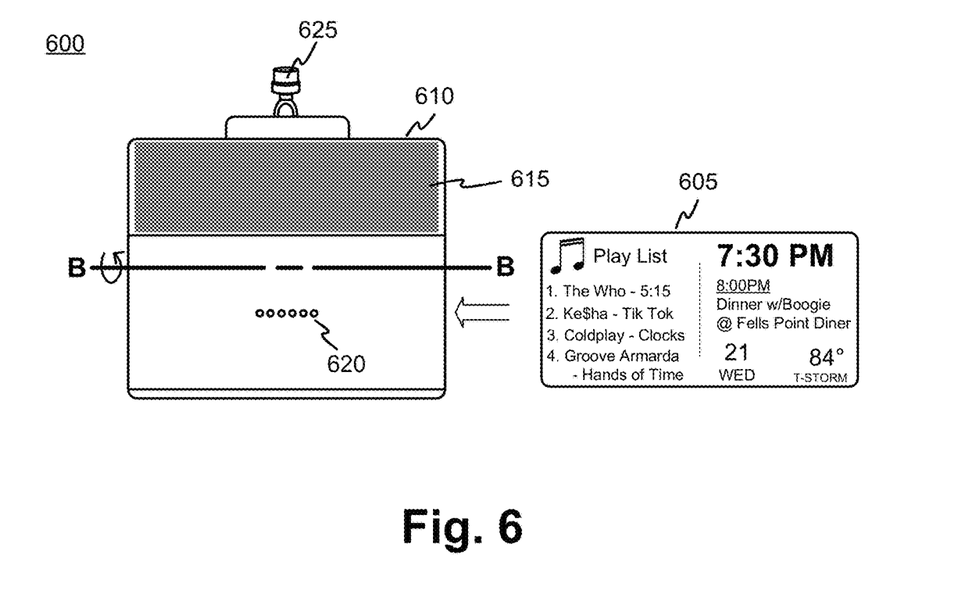
FIG. 6 shows an exemplary wearable device having a planar touch surface which may be coupled to a lanyard.

FIG. 6 shows an exemplary pendant 600 of a wearable device having a planar touch surface which may be coupled to a loop. Pendant 600 may include core unit 605, case 610, touch user interface 615, and ICI 620. Core unit 605 may be interchangeably attached to case 610, so core unit 615 may be easily swapped for use with other wearable devices. Core unit 605 may exchange data and/or power with case 610 through ICI 620. Pendant 600 may connect to a loop supported by a user's neck through connector 625. The loop may include, for example, a lanyard, a necklace, a collar, etc.

Core unit 605 may include a display and show information based on the user's preferences. For example, as shown in FIG. 6, the display on core unit 605 may show a play list generated by a music application on the left side, and time, weather, date, and calendar information on the right side of the display. The touch user interface 615 may be positioned substantially within a same plane as the display of the core unit 605, and may be positioned above the display of core unit 605. The arrangement of touch user interface 615 permits easy access to wearable device 600 when it is being used as a pendant. To conveniently view the display on core unit 605 and/or interact with touch user interface 615 when pendant 600 is being worn, the user may simply flip up pendant 600 (effectively rotating the pendant 180 degrees along axis B-B) in a manner which vertically inverts the front of pendant 600 with respect to the user. Accordingly, with respect to the user, the touch user interface 615 is now positioned below the display of core unit 605, and thus may be used to enter touch input without obscuring the display of core unit 605. Moreover, the display of core unit 605 may automatically be flipped vertically from the orientation shown in FIG. 6, so as to not appear upside-down to the user. Core unit 605 may use motion and/or orientation sensor to determine when the wearable device 600 is vertically flipped. In another aspect, an alignment mechanism in core 605 (or other cores described herein) may automatically adjust an angular orientation of a displayed on the core with gravity, regardless of the angle at which a user views, holds, observers, or places, the core.

Figure 7:
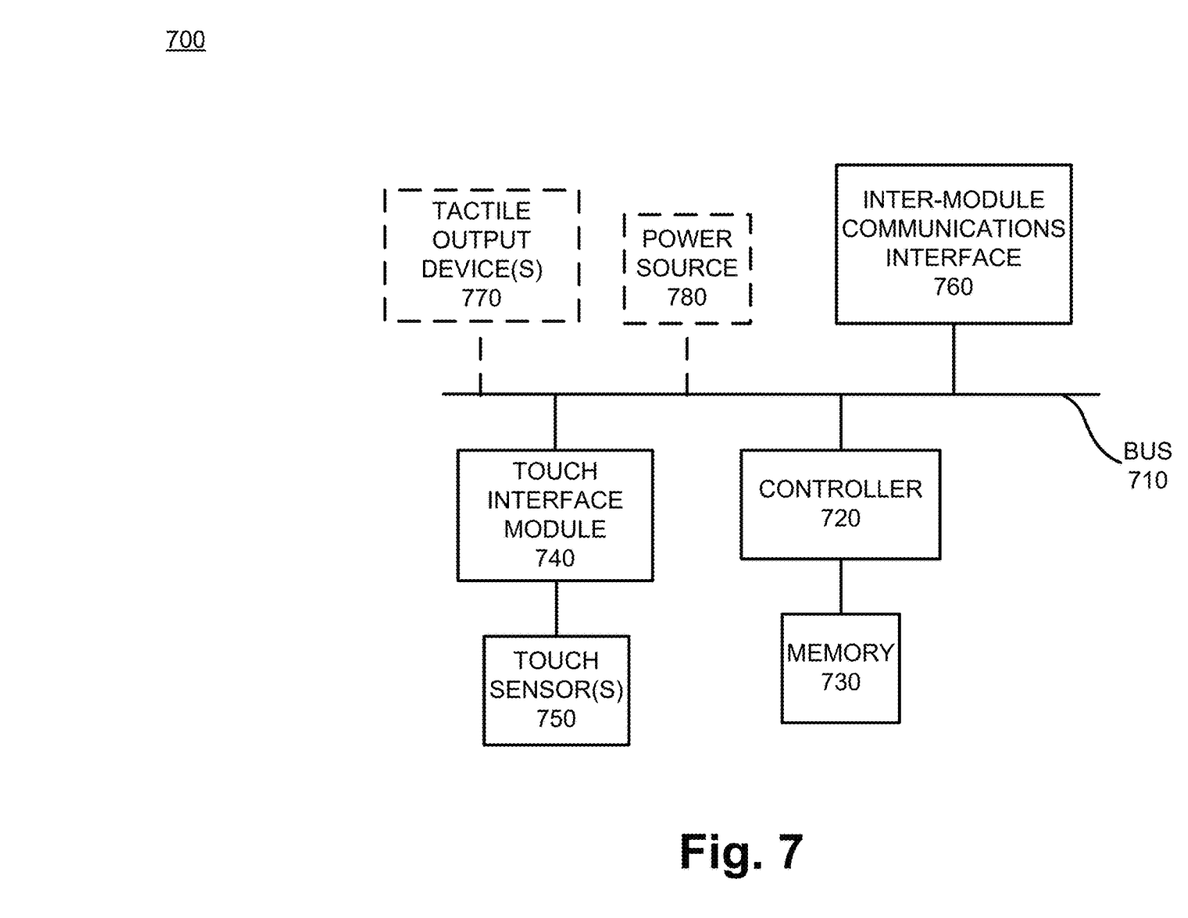
FIG. 7 is a block diagram illustrating exemplary components of a container of a wearable device consistent with an embodiment.

FIG. 7 is a block diagram of illustrating exemplary functional components of a container 700 (e.g., 110, 210) of a wearable device (e.g., 100, 200, 400, 500, 600) consistent with an embodiment. Container 700 may include a bus 710, a controller 720, a memory 730, touch interface module 740, touch sensor(s) 750, and inter-module communications interface (ICI) 760. Container 700 may optionally include tactile output device(s) 770, and power source 780 (as indicated by dotted lines in FIG. 7).

Bus 710 includes a path that permits communication among the components of container 700. Controller 720 may include any type of microcontroller unit (MCU), single-core processor, multi-core processor, microprocessor, latchbased processor, and/or processing logic (or families of processors, microprocessors, and/or processing logics) that interprets and executes instructions. In other embodiments, controller 720 may include an application-specific integrated circuit (ASIC), a field-programmable gate array (FPGA), and/or another type of integrated circuit or processing logic.

As shown in FIG. 7, memory 730 may reside on-board controller 720, and include any type of dynamic storage device that may store information and/or instructions, for execution by controller 720, and/or any type of non-volatile storage device that may store information for use by controller 720. Additionally or alternatively, memory 730 may reside outside controller 720 and interface directly to bus 710. Memory 730 may include a random access memory (RAM) or another type of dynamic storage device, a read only memory (ROM) device or another type of static storage device, and/or erasable persistent storage such as flash memory. Memory 730 may store an operating system used by controller 720, APIs, lower level software, and/or firmware.

Touch interface module 740 may work in conjunction with touch sensor(s) 750 to support the various touch user interfaces described herein. The touch user-interface module may include electronics for processing signals from touch sensor(s) 750 to detect touch user inputs. Touch interface module 740 may also work in conjunction with controller 720 to generate commands which may be based on the signals provided by touch sensor(s). Touch interface module 740 may include fast processing hardware (e.g., FPGAs, ASICs, etc.) to process outputs from touch sensor(s) 750. Touch sensor(s) 750 may be capacitive touch sensors, resistive touch sensors, etc., which may be formed or otherwise attached any part of container 700. For example, touch sensor(s) 750 may reside inside a case and be associated with zones forming a touch user interface on the surface of the case. Attentively, touch sensor(s) 750 may lie outside the case of container 700 in another part of the container, such as, for example, portions of the container which are used to affix the wearable device to a user. For example, touch sensor(s) 750 may reside in bands (watch bands, wrist bands, arm bands, etc.), bangles, lanyards, necklaces, and/or collars. Touch sensors 750 may also reside within articles of clothing (e.g., shirts, pants, bodysuits, etc.) and/or accessories (e.g., gloves, hats, belts, bangles etc.).

ICI 760 permits communications between the container 700 and a core unit (e.g., 105, 205, 405, 505, 605) to allow information from touch interface module 740 to be passed to the core unit. The information may be passed in the form of signals from touch sensor(s) 750, which may be processed and/or digitized by touch interface module 740, for further processing into commands by the core unit. Alternatively, touch interface module 740 may detect and generate commands from signals provided by touch sensor(s) 750, and provide the commands to the core unit for execution through ICI 760. Additionally, ICI 760 may receive feedback signals and/or commands from the core unit, which may be provided as an acknowledgment to a received touch input or an executed command. ICI 760 may be any type of hardwired serial interface, which may include a serial peripheral interface (SPI), a USB interface, etc. Additionally or alternatively, ICI 760 may include a wireless interface, such as, for example, Bluetooth, to pair container 700 with the core unit for data communications. ICI 760 may also have the ability to provide power from container 700 to the core unit, or receive power at the container 700 provided by the core unit.

Tactile output device 770 may be used to deliver haptic feedback to the user when a touch user interface command is received, and/or when a command is executed, and/or to provide various forms of communication to the user. The tactile output devices may be inside the case (e.g., 125, 225, 410, 510, and 610) of container 700, or may be in other parts of container 700 outside of the case. For example, tactile output device(s) 770 may be placed in bands (watch bands, arm bands, etc.), bangles, lanyards, necklaces, and/or collars. Tactile output device(s) 770 may also be placed within articles of clothing (e.g., shirts, pants, bodysuits, etc.) and/or accessories (e.g., gloves, hats, belts, bangles etc.). Optional power source 780 may include a battery to power container 700 and/or the core, and may further include power conditioning electronics to generate various voltage levels which may be required by the components in container 700 and/or the core.

As described below, container 700 may perform certain operations relating to receiving touch user interface information, and exchanging the information with the core unit. Container 700 may perform these operations in response to controller 720 executing software instructions contained in a computer-readable medium, such as memory 730. Alternatively, hardwired circuitry may be used in place of, or in combination with, software instructions to implement processes described herein. Thus, implementations described herein are not limited to any specific combination of hardware circuitry and software. Although FIG. 7 shows exemplary components of container 700, in other implementations, container 700 may include fewer components, different components, additional components, or differently arranged components than depicted in FIG. 7.

Figure 8:
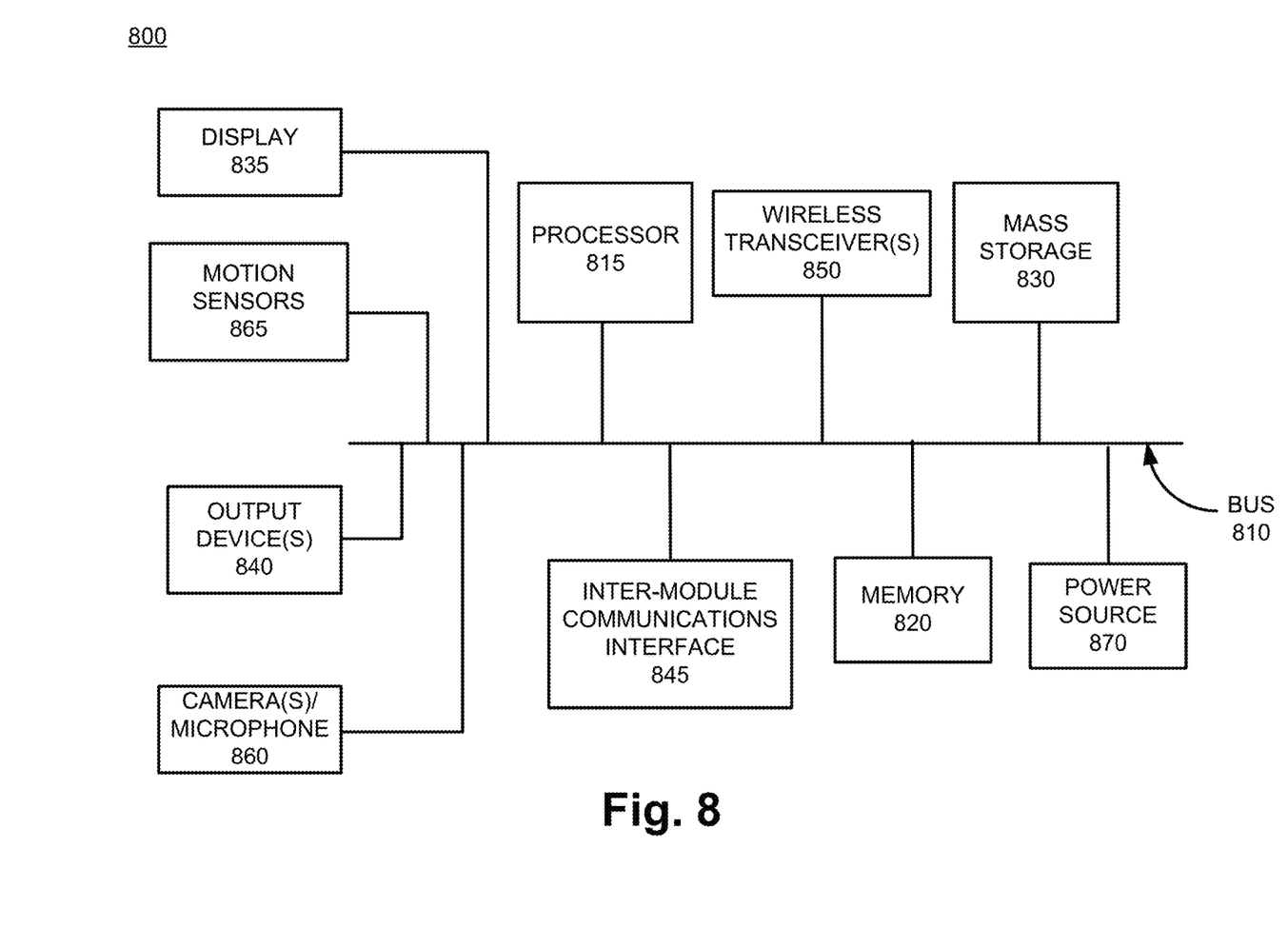
FIG. 8 is a block diagram illustrating exemplary components of a core unit of a wearable device consistent with an embodiment.

FIG. 8 is a block diagram of illustrating exemplary components of a core unit 800 (e.g., 105, 205, 405, 505, 605) of a wearable device. Core unit 800 may include a bus 810, a processor 815, a memory 820, a mass storage device 830, a display 835, one or more output device(s) 840, an inter-module communications interface (ICI) 845, wireless transceiver(s) 850, one or more camera(s) and/or microphone 860, motion sensors 865, and power source 870. Bus 810 may include a path that permits communication among the elements of core unit 800.

Processor 815 may include a processor, microprocessor, or processing logic that may interpret and execute instructions. Memory 820 may include a random access memory (RAM) or another type of dynamic storage device that may store information and instructions for execution by processor 815. Memory 820 may also include a read only memory (ROM) device or another type of static storage device that may store static information and instructions for use by processor 815. Mass storage device 830 may include a solid state devices such as flash memory, and/or persistent storage devices.

Display 835 may be any suitable device, e.g., having low power consumption requirements, and the ability to present content which may be efficiently discerned by a user in any lighting environment. Accordingly, display 835 presents screens having good contrast in rooms having low lighting conditions and outdoors in direct sunlight. Display 835 may utilize technologies associated with passive (reflective) displays and/or active displays. For example, display 835 may utilize a touch sensitive e-Ink display, which is a low voltage, static display technology. As used herein, a static display may be defined as a display which does not have to be dynamically refreshed to retain displayed content, and maintains a persistent screen while drawing minimal power until visual content is updated. In other embodiments, display 835 may use a low power liquid crystal device (LCD), organic light emitting diode (OLED), or any appropriate display technology. Embodiments may also include displays made from flexible materials which may be incorporated into the designs of wearable articles as structural elements, or functional elements, or fashion-related elements.

Output device(s) 840 may include one or more mechanisms that output information to the user, which may include a speaker for audio information, light emitting diodes as a visual indicator, and/or tactile output devices (as described above in reference to tactile output device 770 in FIG. 7) for providing haptic feedback to the user.

ICI 845 permits communications between the core unit 800 and container 700 to allow information from touch interface module 740 to be passed to the core unit 800, and/or allow various haptic feedback signals/commands to be provided to container 700 for use by tactile output devices 770. Information from touch sensor(s) 770 may be received by core unit 800 in the form of signals, which may be processed and/or digitized by touch interface module 740, for generating commands for core unit 800. Alternatively, core unit 800 may receive commands which are generated by controller 720 based on information provided by touch interface module 740 and touch sensor(s) 750. Additionally, ICI 845 may send feedback signals and/or commands from core unit 800 to container 700 as an acknowledgment to a received touch input or an executed command. ICI 845 may be any type of hardwired serial interface, which may include a serial peripheral interface (SPI), a USB interface, etc. Additionally or alternatively, ICI 845 may include a wireless interface, such as, for example, Bluetooth, to pair core unit 800 with container 700 for data communications. ICI 845 may also have the ability to provide power from core unit 800 to container 700, or receive power at the core unit 800 provided by container 700.

Wireless transceiver(s) 850 may include any wireless device(s) which permit core 800 to exchange information with container 700 wirelessly, and/or communicate with other network devices on network. Wireless transceiver(s) 850 may support any wireless standard appropriate for wide area networks (e.g., cellular networks) local area networks, personal area networks, and/or near field communication channels (NFCs). For example, wireless transceiver(s) 850 may support wireless technology standards which may include, for example, Bluetooth, Bluetooth Low Energy, Zigbee, WiFi, various IEEE 802.11 protocols, etc. Wireless transceiver(s) 850 may also support communications with wireless networks of any type, such as, for example, a local area network (LAN), a wide area network (WAN), a wireless satellite network, and/or one or more wireless public land mobile networks (PLMNs). The PLMN(s) may include a Code Division Multiple Access (CDMA) 2000 PLMN, a Global System for Mobile Communications (GSM) PLMN, a Long Term Evolution (LTE) PLMN and/or other types of PLMNs not specifically described herein. Wireless transceiver(s) 850 may also support wide area wireless networks covering larger areas, may include a mesh network (e.g., IEEE 801.11s), and/or or a WiMAX IEEE 802.16. Wireless transceiver(s) 850 also may support communications over local area wireless networks which may include WiFi (e.g., any IEEE 801.11x network, where x=a, b, c, g, and/or n). Additionally, wireless transceiver(s) 850 may further support near field communications (NFC) with compatible devices. In an embodiment, wireless transceiver(s) 850 may also be incorporated into ICI 845 when wireless communications of core 800 are restricted to exchanging information with container 700.

Camera(s)/microphone sensor 860 may include one or more cameras to record image and/or video data. One or more microphones may be included to further record audio. Motion sensors 865 may include one or more accelerometers which may detect acceleration in up to three dimensions. The accelerations may be further processed to determine displacements. Motion sensors may further include gyroscopes to measure orientation and/or compasses to determine direction.

Power source 870 may include a battery to power core unit 800 and, if necessary, container 770 if container 770 does not have a separate power source. Power source 870 may further include power conditioning electronics to generate various voltage levels which may be required by the components in core 800, and/or container 700.

Core unit 800 may perform certain operations or processes, as may be described herein to operate, interact, and exchange data with container 700. Core unit 800 may perform these operations in response to processor 815 executing software instructions contained in a computer-readable medium, such as memory 820 and/or mass storage device 830. A computer-readable medium may be defined as a physical or logical memory device. A logical memory device may include memory space within a single physical memory device or spread across multiple physical memory devices. The software instructions may be read into memory 820 from another computer-readable medium, such as storage device 830, or from another device via wireless transceiver(s) 850 and/or ICI 845. The software instructions contained in memory 820 may cause processor 815 to perform operations or processes, in whole or in part, which are described in detail with respect to FIG. 9. Alternatively, hardwired circuitry may be used in place of or in combination with software instructions to implement processes consistent with the principles of the embodiments. Thus, exemplary implementations are not limited to any specific combination of hardware circuitry and software.

The configuration of components of core unit 800 illustrated in FIG. 8 is for illustrative purposes only. It should be understood that other configurations may be implemented. Therefore, core unit 800 may include additional, fewer and/or different components than those depicted in FIG. 8.

Figure 9:
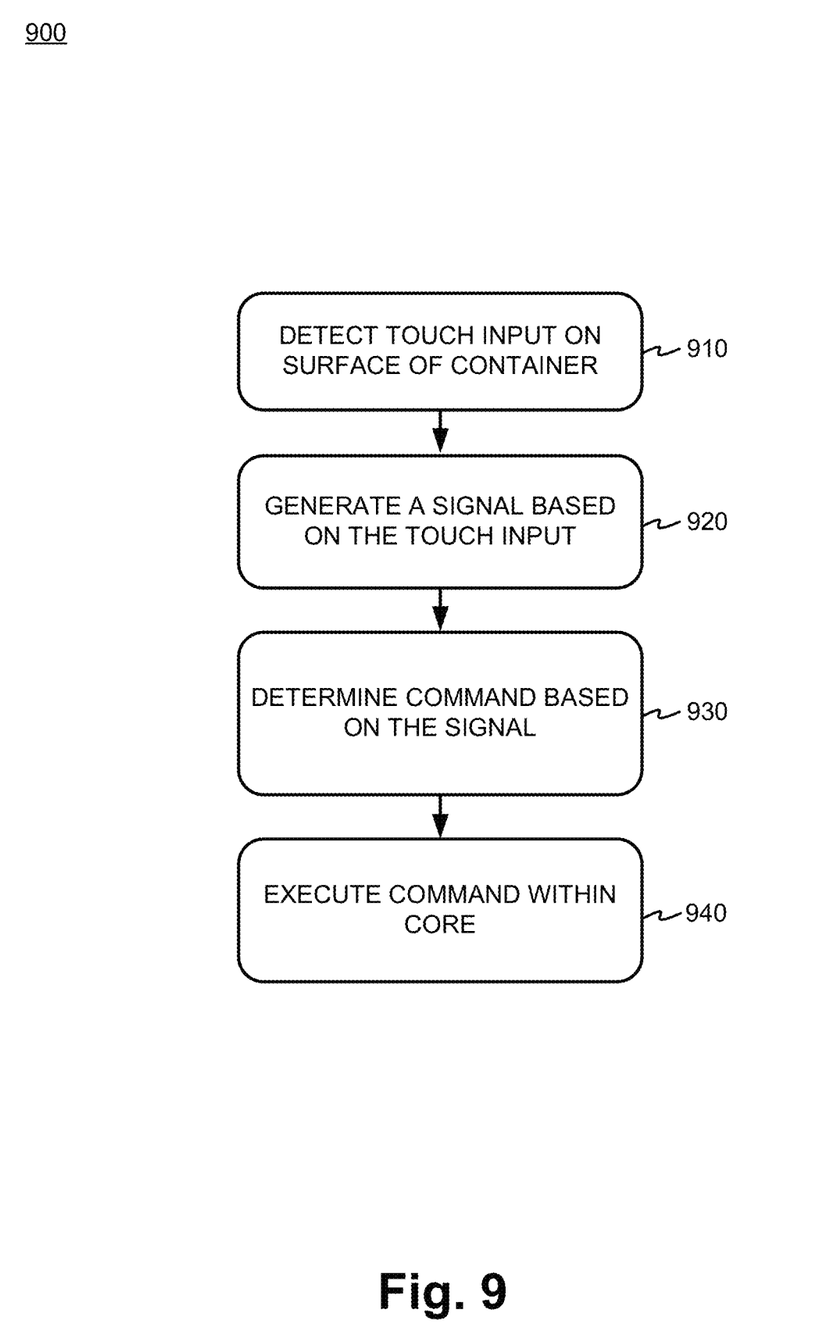
FIG. 9 is a flow chart showing an exemplary process associated with the wearable device consistent with an embodiment.

FIG. 9 is a flow chart showing an exemplary process 900 associated with a wearable device (e.g., 100, 200, 400, 500) consistent with an embodiment. Process 900 may be performed, in whole or in part, on processor 815 of core unit and/or controller 720 on container 700. Wearable device may initially detect a touch input on a surface of container 700 (Block 910). The detection may be performed by touch sensor(s) 750.

The wearable device may generate a signal in response to the detected touch input (Block 920). The signal may be generated by touch sensor(s) 750 working in conjunction with touch interface module 740.

The wearable device may then determine a command based on the signal (Block 930). In an embodiment, determining the command may include controller 720 and/or touch interface module 740 analyzing the signal generated in response to the detected touch input, controller 720 generating a command in response to the analyzing, and controller 720 sending the command to the core unit 800 over ICI 760.

In another embodiment, controller 720 may send the signal generated in response to the detected touch input to core unit 800, where processor 815 may analyze the signal generated in response to the detected touch input. In this scenario, processor 815 generates a command in response to analyzing the signal. Detecting a touch input may include having wearable device distinguish between a single touch, a multi-touch, or a gesture, wherein a gesture may include at least one of a sliding, a tapping, a pinching, a rotating, or a duration of a touch.

In an embodiment, the wearable device may detect a touch input on at least one of a watch case or a watch band (e.g., 135, 140). In another embodiment, the wearable device may detect a touch input on at least one of a pendant or a loop (e.g., 235, 245), wherein the pendant is suspended from a loop supported by a neck of a user (e.g., as illustrated in FIG. 2).

In yet another embodiment, wearable device may detect a touch input on a surface of the pendant which lies within a same plane as a display of the core unit (e.g., 505, 605). The surface may be displaced from the display so that a user entry of the touch input does not obscure the display, as illustrated in FIGS. 5 and 6. In another embodiment, the wearable device may detect one or more touch inputs on a necklace, where the touch inputs may include at least one of a sliding, a tapping, a pinching, or a duration of a touch. Additionally or alternatively, the wearable device may detect one or more touch inputs on a lanyard, where the touch inputs may include at least one of a tugging, a stretching, a sliding, a tapping, a pinching or a duration of touch.

The wearable device may execute the command within a core unit 800 (Block 940). The core unit 800 may be removeably attached to container 700. Additionally, core unit 800 may generate an output signal in response to the touch input, and provide a tactile feedback to a user through container 700.

The foregoing description of implementations provides illustration and description, but is not intended to be exhaustive or to limit the invention to the precise form disclosed. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with regard to FIG. 9, the order of the blocks may be modified in other embodiments. Further, non-dependent processing blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
   detecting a touch input on at least one of a pendant or a loop, wherein the pendant is suspended from the loop supported by a neck of a user, and wherein the detecting further comprises detecting the touch input via a touch user interface on a planar touch surface of the pendant which lies substantially within a same plane as a display, wherein the planar touch surface is offset from the display so that user entry of the touch input does not obscure the display, and further wherein contents of the display are automatically oriented for viewing when the user inverts a front of the pendant, by a rotation of the pendant about an axis that is substantially parallel to an edge of the display and is contained entirely within the plane of the display, to allow the user to interact with the planar ouch surface and view the display while the pendant is being worn by the user;
   generating a signal in response to the detected touch input;
   determining a command based on the signal; and
   executing the command within a core unit, wherein the core unit is interchangeably attached to the pendant, and wherein the core unit includes a battery that provides power to the pendant via an inter-module communications interface (ICI), further wherein the pendant does not include a separate power source.

2. The method of claim 1, wherein the determining a command comprises:
   analyzing, within the pendant; the signal generated in response to the detected touch input;
   generating, within the pendant, the command in response to the analyzing; and
   sending, from the pendant, the command to the core unit.

3. The method of claim 1, wherein the determining a command comprises:
   sending, to the core unit, the signal generated in response to the detected touch input;
   analyzing, within the core unit, the signal generated in response to the detected touch input; and
   generating, within the core unit, a command in response to the analyzing.

4. The method of claim 1, wherein detecting a touch input on the planar touch surface of the pendant comprises:
   distinguishing between a single touch, a multi-touch, or a gesture, wherein a gesture includes at least one of a sliding, a tapping, a pinching, a rotating, or a duration of a touch.

5. The method of claim 1, wherein the detecting comprises detecting the touch input on the loop, wherein detecting the touch input on the loop further comprises:
   detecting one or more touch inputs on a necklace, wherein the touch inputs include at least one of a sliding, a tapping, a pinching, or a duration of a touch, or
   detecting one or more touch inputs on a lanyard, wherein the touch inputs include at least one of a tugging, a stretching, a sliding, a tapping, a pinching or a duration of touch.

6. The method of claim 1, further comprising:
   generating, in the core unit, an output signal in response to the touch input; and
   providing a tactile feedback to the user through the pendant.

7. A device, comprising:
   a container configured to couple to a user, wherein the container comprises:
      a touch interface having a touch sensor associated with at least one planar touch surface of the container;

a pendant, which is suspended from a loop, wherein the
touch sensor lies substantially within a same plane of
a display of a core unit, wherein the touch sensor is
offset from the display so that an entry of a touch
input does not obscure the display;

a first inter-module communications interface (ICI);

a controller coupled to the touch interface and the first
ICI; wherein the container does not include a separate power source; and the core unit, interchangeably attached to the container,
wherein the core unit further comprises:

the display;

a second ICI which is communicatively coupled to the
first ICI;

a battery that provides power to the core unit and the
container, wherein the container receives the power
from the second ICI via the first ICI;

a memory to store instructions; and a processor, coupled to the display, the second ICI, and
the memory, the processor being configured to
execute the instructions stored in memory to:

receive information through the first ICI and the second
ICI generated by touch interface, wherein the information is associated with a user command, perform an operation in accordance with the received
information associated with the user command, and generate contents for the display, wherein the contents
are automatically oriented for viewing when the user
inverts a front of the pendant, by a rotation about an
axis that is substantially parallel to an edge of the
display and is contained entirely within the plane of
the display, to allow the user to interact with the
touch sensor and view the display while the pendant
is being worn by the user.

8. The device of claim 7, wherein:

the touch interface is configured to detect a touch input on
the planar touch surface of the container and generate
a signal in response to the detected touch input, and
wherein:

the controller is configured to analyze the signal generated
in response to the detected touch input, generate a
command in response to the analyzing, and send the
command to the core unit.

9. The device of claim 7, wherein:

the touch interface is configured to detect a touch input on
the planar touch surface of the container, and generate
a signal in response to the detected touch input, the
controller is configured to send the generated signal to
the core unit, and the core unit is configured to analyze
the signal received from the controller, and generate a
command in response to the analyzing.

10. The device of claim 7, wherein the container further
comprises:

the loop which is supported by a neck of the user and has
a first touch sensor associated with a surface of the
loop, wherein the pendant is suspended from the loop
and has a second touch sensor associated with the at
least one planar touch surface of the pendant.

11. The device of claim 7, wherein the container electrically interfaces to transducers in articles of clothing, wherein
the transducers are measurement sensors to track body
motion during user activity.

12. The device of claim 7, wherein the container electrically interfaces to transducers in articles of clothing, wherein
the transducers are sensors to measure at least one of
heartrate, respiration, temperature, or perspiration.

13. The device of claim 7, wherein the instructions further
cause the at least one processor to:

detect one or more touch inputs on the loop which further
comprises a necklace, wherein the touch inputs include
at least one of a sliding, a tapping; a pinching, or a
duration of a touch, or detecting one or more touch inputs on the loop which
further comprises a lanyard, wherein the touch inputs
include at least one of a tugging, a stretching, a sliding,
a tapping, a pinching or a duration of touch.

14. A non-transitory computer-readable medium comprising instructions, which, when executed by at least one
processor, causes the at east one processor to:

detect a touch input on at least one of a pendant or a loop,
wherein the pendant is suspended from the loop supported by a neck of a user, and wherein the detecting
further comprises detecting the touch input via a touch
user interface on a planar touch surface of the pendant
which lies substantially within a same plane as a
display, wherein the planar touch surface is offset from
the display so that user entry of the touch input does not
obscure the display, and further wherein contents of the
display are automatically oriented for viewing when the
user inverts a front of the pendant, by a rotation about
an axis that is substantially parallel to an edge of the
display and is contained entirely within the plane of the
display, to interact with the planar touch surface and
view the display while the pendant is being worn by the
user;

generate a signal n response to the detected touch input;

determine a command based on the signal; and execute the command within a core unit, wherein the core
unit is interchangeably attached to the pendant, and
wherein the core unit includes a battery that provides
power to the pendant via an inter-module communications interface, further wherein the pendant does not
include a separate power source.

15. The non-transitory computer-readable medium of
claim 14, wherein the instructions to determine a command
further cause the at least one processor to:

analyze, within the pendant, the signal generated in
response to the detected touch input;

generate, within the pendant, the command in response to
the analyzing; and send, from the pendant, the command to the core unit.

16. The non-transitory computer-readable medium of
claim 14, wherein the instructions to determine a command
further cause the at least one processor to:

send, to the core unit, the signal generated in response to
the detected touch input;

analyze, within the core unit, the signal generated in
response to the detected touch input; and generate, within the core unit, a command in response to
the analyzing.

17. The non-transitory computer-readable medium of
claim 14, wherein the instructions to detect a touch input on
a planar touch surface of the pendant further cause the at
least one processor to:

distinguish between a single touch, a multi-touch, or a
gesture, herein a gesture includes at least one of a
sliding, a tapping, a pinching, a rotating, or a duration
of a touch.

18. The non-transitory computer-readable medium of
claim 14, wherein the instructions to detect the touch input
on the loop further cause the at least one processor to:

detect one or more touch inputs on a necklace, wherein the touch inputs include at least one of a sliding, a tapping, a pinching, or a duration of a touch, or detect one or more touch inputs on a lanyard, wherein the touch inputs include at least one of a tugging, a stretching, a sliding, a tapping, a pinching or a duration of touch.

19. The non-transitory computer-readable medium of claim 14, wherein the instructions further cause the at least one processor to:

generate, in the core unit, an output signal in response to the touch input; and provide a tactile feedback to the user through the pendant.

20. The non-transitory computer-readable medium of claim 14, wherein the pendant electrically interfaces to transducers in articles of clothing, wherein the transducers are measurement sensors to track body motion during user activity.

\* \* \* \* \*